(12) United States Patent
Marlett et al.

(10) Patent No.: US 7,542,508 B2
(45) Date of Patent: Jun. 2, 2009

(54) CONTINUOUS-TIME DECISION FEEDBACK EQUALIZER

(75) Inventors: Mark J Marlett, Livermore, CA (US); Mark Rutherford, Wellington, CO (US)

(73) Assignee: LSI Logic Corporation, Milpitas, CA (US)

( * ) Notice: Subject to any disclaimer, the term of this patent is extended or adjusted under 35 U.S.C. 154(b) by 605 days.

(21) Appl. No.: 11/111,403

(22) Filed: Apr. 21, 2005

(65) Prior Publication Data
US 2006/0239341 A1 Oct. 26, 2006

(51) Int. Cl.
*H03H 7/30* (2006.01)
*H03K 5/159* (2006.01)

(52) U.S. Cl. .................. 375/233; 375/234; 375/235; 375/236

(58) Field of Classification Search ............... 375/233, 375/229, 232, 234, 236, 296, 358
See application file for complete search history.

(56) References Cited

U.S. PATENT DOCUMENTS

| | | | | |
|---|---|---|---|---|
| 4,238,779 A * | 12/1980 | Dickinson et al. | ........... | 714/704 |
| 4,597,088 A * | 6/1986 | Posti et al. | ........... | 375/230 |
| 5,249,200 A * | 9/1993 | Chen et al. | ........... | 375/285 |
| 5,327,460 A * | 7/1994 | Batruni | ........... | 375/233 |
| 5,436,929 A * | 7/1995 | Kawas Kaleh | ........... | 375/233 |
| 5,646,958 A * | 7/1997 | Tsujimoto | ........... | 375/233 |
| 6,002,717 A * | 12/1999 | Gaudet | ........... | 375/232 |
| 6,226,322 B1 * | 5/2001 | Mukherjee | ........... | 375/229 |
| 6,437,932 B1 | 8/2002 | Prater et al. | ........... | 360/46 |
| 6,690,723 B1 * | 2/2004 | Gosse et al. | ........... | 375/233 |
| 6,798,832 B1 * | 9/2004 | Nakata et al. | ........... | 375/233 |
| 6,940,898 B2 * | 9/2005 | Shanbhag et al. | ........... | 375/234 |
| 7,023,946 B2 * | 4/2006 | Sawada et al. | ........... | 375/375 |
| 2005/0254569 A1 * | 11/2005 | Momtaz | ........... | 375/233 |

OTHER PUBLICATIONS

Godard, D; "Self-Recovering Equalization and Carrier Tracking in Two-Dimensional Data Communication Systems", Communications, IEEE Transactions on [legacy, vol. 28, Issue 11, Nov. 1980 pp. 1867-1875.*

An Adaptive Analog Noise-Predictive Decision-Feedback Equalizer; Michael Q. Le, Member, IEEE, Paul J. Hurst, Fellow, IEEE, and John P. Keane, Student Member, IEEE; 0018-9200/02$17.00 © 2002 IEEE.

Analog and Mixed-Signal Circuits for Digital Communication; Richard R. Spencer and Paul J. Hurst; Department of Electrical and Computer Engineering, University of California, Davis, CA 95616; Final Report on 1999-00 MICRO Project #99-111; Industrial Sponsors: Level-One Communications, National Semiconductor and Silicon Systems, Inc.

(Continued)

*Primary Examiner*—Chieh M Fan
*Assistant Examiner*—Qutbuddin Ghulamali
(74) *Attorney, Agent, or Firm*—Suiter Swantz pc llo

(57) ABSTRACT

A continuous-time domain Decision Feedback Equalizer (DFE) for use in a serial communication channel comprises in one embodiment a summer, a decision circuit, a capture flip-flop (FF) and an N-th order active filter. The DFE and its active filter operate in continuous time to give improved performance over a discrete-time DFE. In one embodiment involving a first-order active filter, the capture FF is outside the continuous-time negative feedback loop of the DFE and involves a differential signal amplifier. In another embodiment, the capture flip-flop is inside the DFE loop, and in a third embodiment the decision circuit comprises a comparator.

15 Claims, 4 Drawing Sheets

OTHER PUBLICATIONS

NRZ Timing Recovery Technique for Band-Limited Channels; Bang-Sup Song, Senior Member, IEEE, and David C. Soo; IEEE Journal of Solid-State Circuits, vol. 32, No. 4, Apr. 1997; 0018-9200/97$10.00 © 1997 IEEE.

* cited by examiner

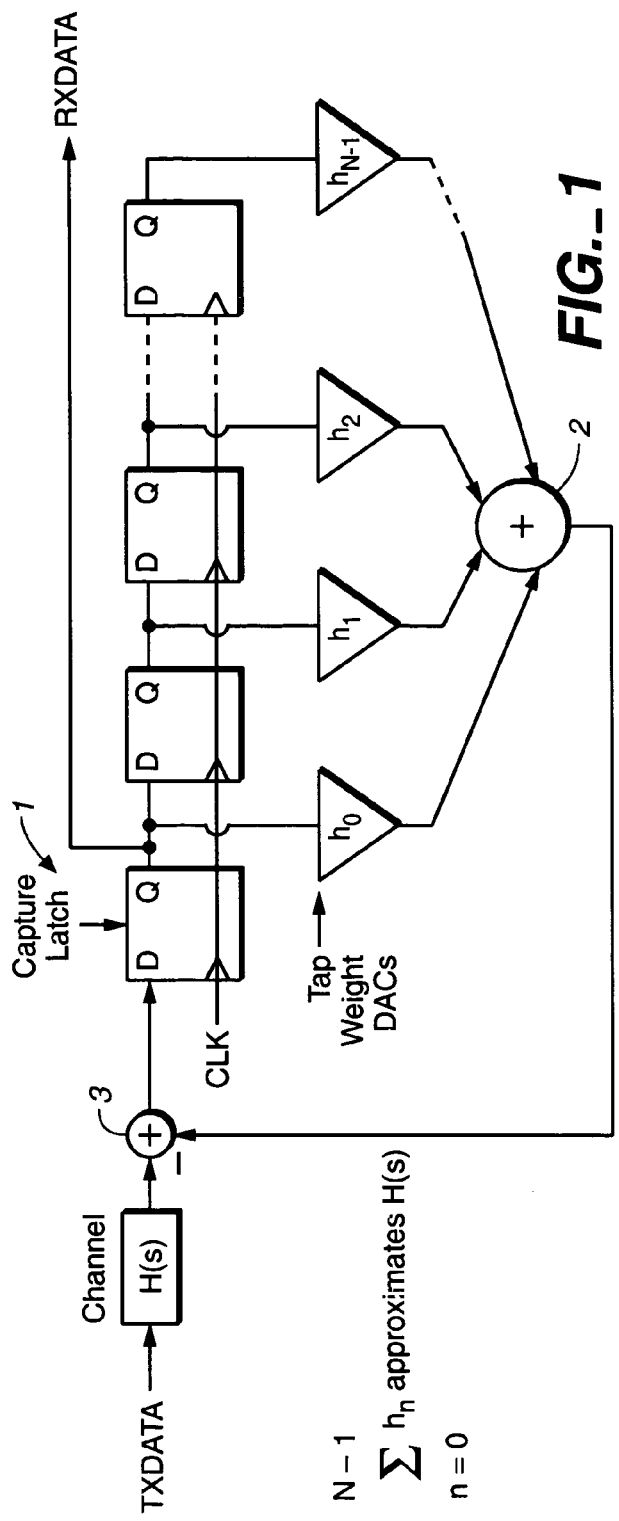
FIG._1
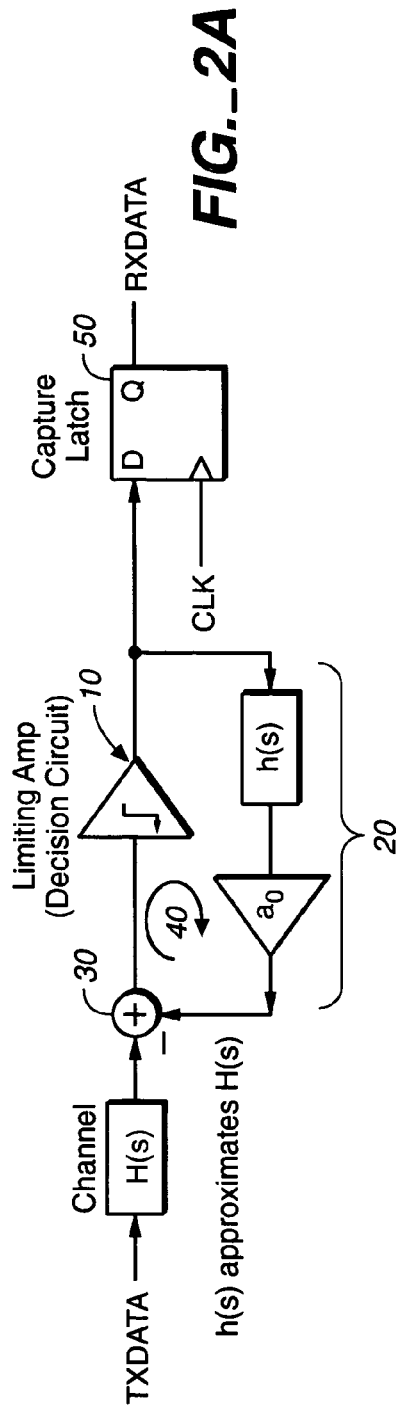
FIG._2A

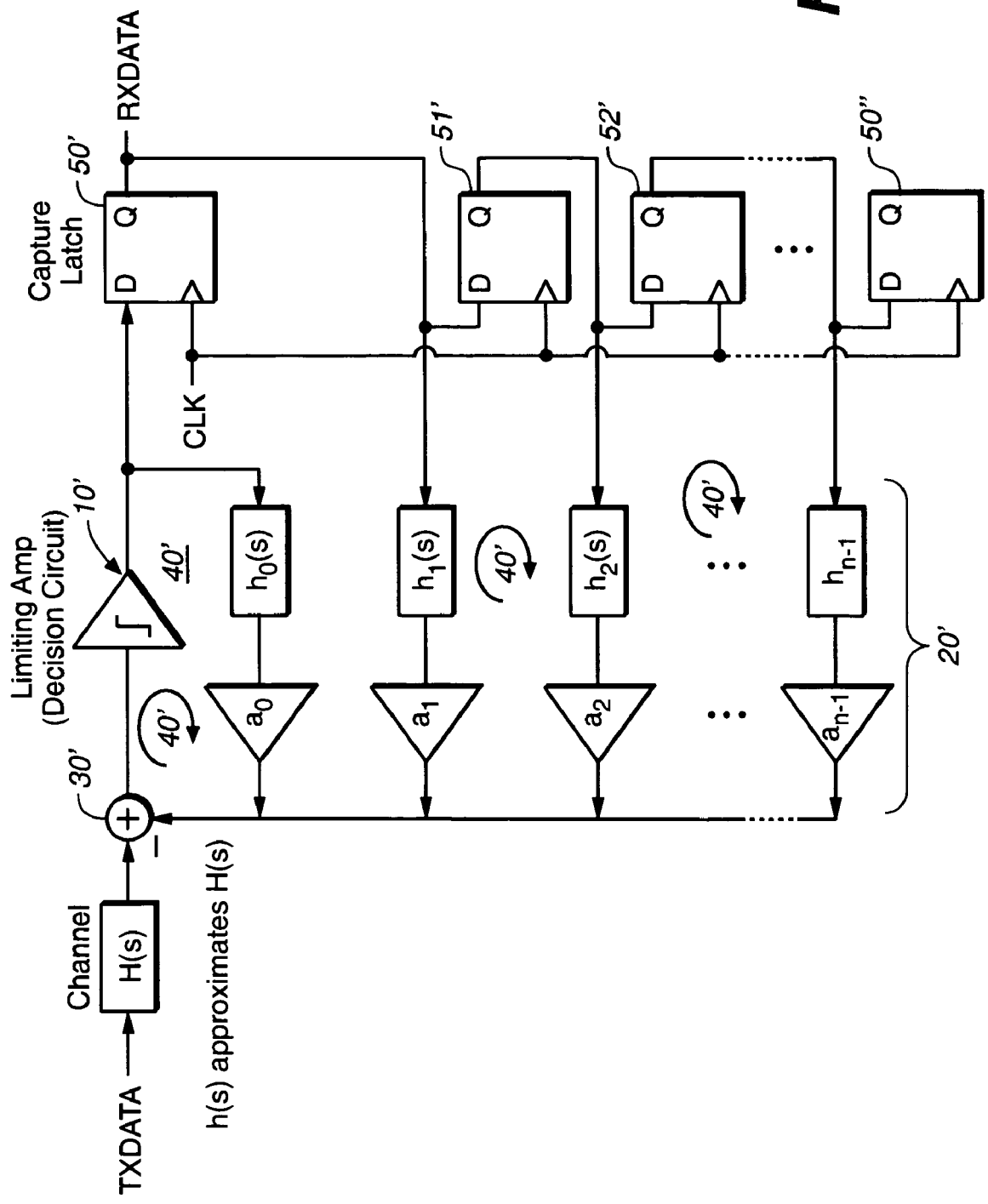
FIG._2B

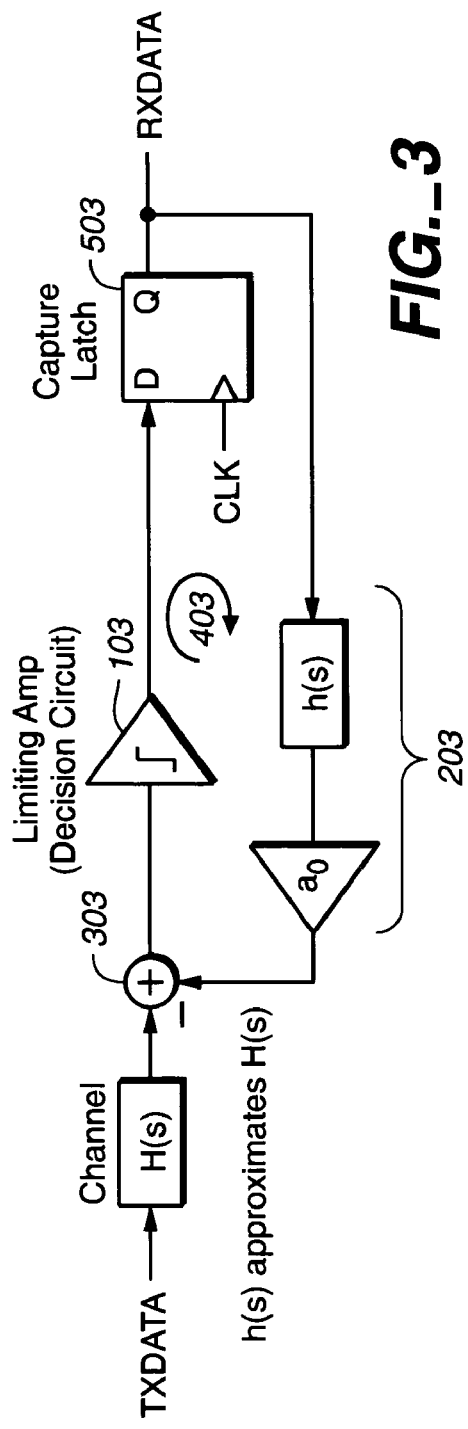
FIG._3
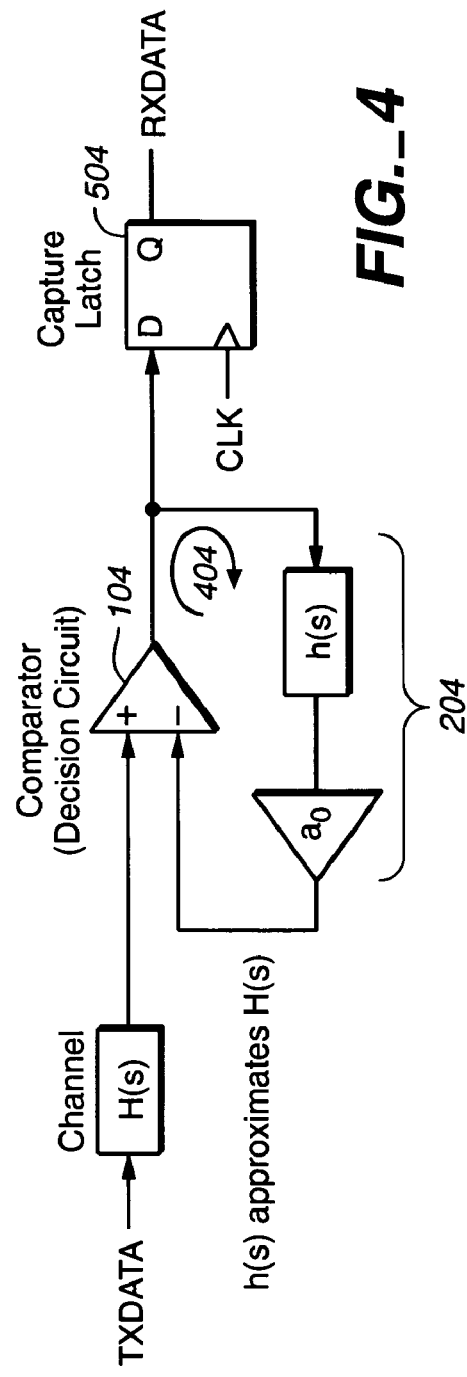
FIG._4

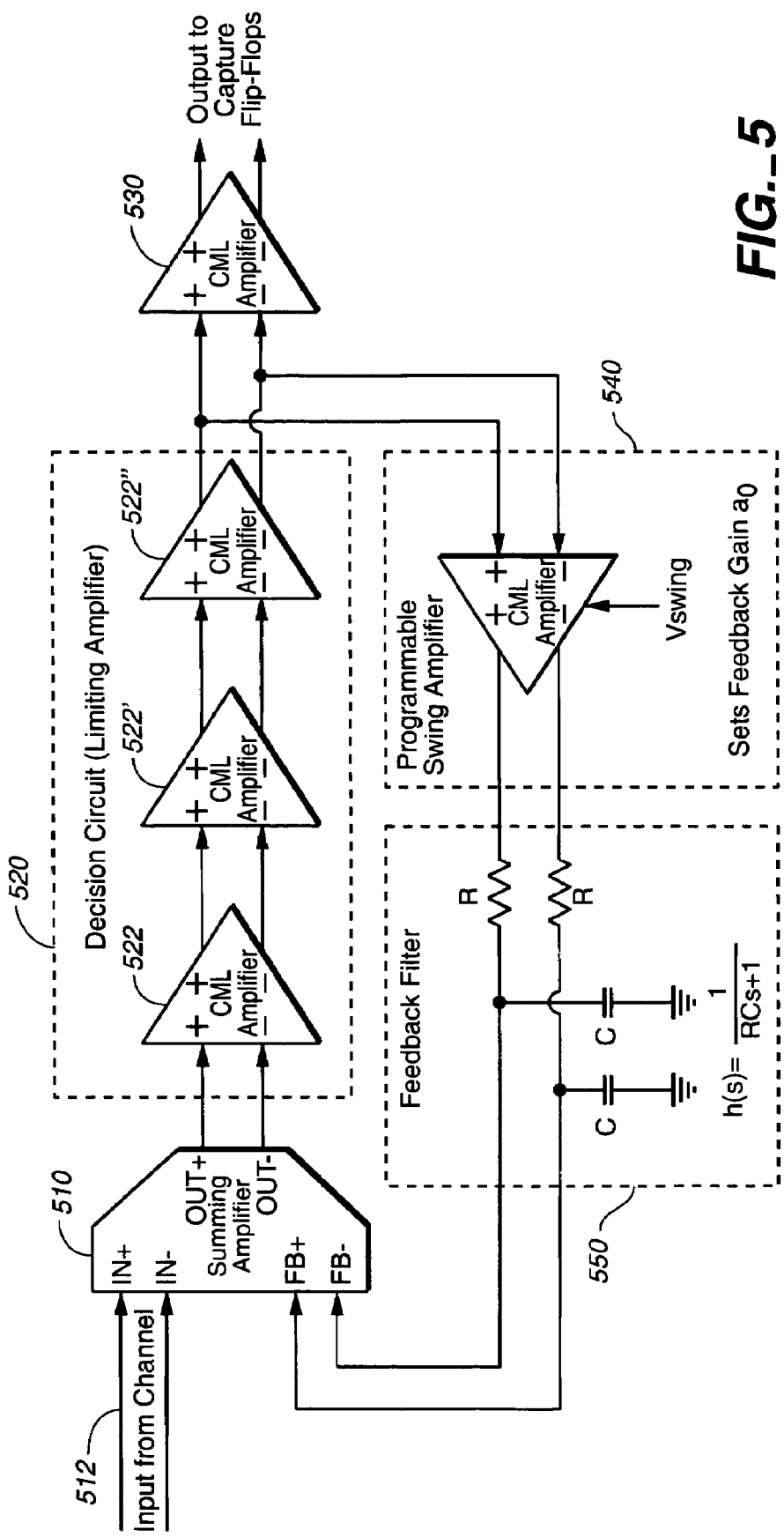
FIG._5

CONTINUOUS-TIME DECISION FEEDBACK EQUALIZER

BACKGROUND OF THE INVENTION

1. Field of Invention

The present invention relates generally to the field of digital filters in mixed-signal communication channels.

2. Description of Related Art

Signal processing in digital communications is concerned with optimizing performance given the constraints of power, noise, bandwidth limitations, area, memory, sampling limitations and numerous other requirements depending on the architecture employed.

Data communication is moving away from parallel busses and towards serial transmission and serial protocols. System designers are under pressure to reliably send data over low bandwidth channels at rates for which they may not have been optimally designed for, and to pack more communication channels into smaller and smaller spaces. This results in increasingly poorer receive signal levels and higher levels of crosstalk, among other problems.

To handle the low bandwidth channels, many receiver designs employ some sort of equalization to boost high frequency signals that are attenuated as the signal passes through the channel. This might be realized using a linear high pass filter, that boosts the high frequency signal was well any associated noise, and thus the signal-to-noise ratio (SNR) remains poor.

As many communication channels effectively act as low-pass filters, decision feedback equalization/equalizers (DFE) are used to help remove noise and distortion of digital signals, such as intersymbol interference (ISI) caused by attenuation of high frequencies.

Some of the problems associated with digital signal processing as addressed by DFE are outlined in U.S. Pat. No. 6,437,932 to Prater et al., commonly assigned to the present assignee, and incorporated herein in its entirety.

To combat such poor SNR and recover data in systems with low SNR, designers have developed decision feedback equalization.

For example, turning attention to FIG. 1, there is shown a decision feedback equalization (DFE) schematic of the kind used in high-speed serial communications. Transmit data TXDATA is sent through the channel having transfer function H(s), and may be distorted by the channel. A capture flip-flop 1, such as a D latch, has an output Q that follows changes in the data input D as long as control input clock CLK is enabled, and holds the binary information present at the data input when the clock CLK is disabled, until such time the clock CLK is enabled again. Capture flip-flop 1 samples the output of summing circuit 3, which has inputs for the data TXDATA coming out of the communication channel, having an impulse transfer function H(s), as well as the negative feedback signal output by summer 2. The capture flip-flop 1 samples the data at the rising edge of clock CLK, and decides whether the incoming data is a binary 1 or a 0 at that instant. Assuming the capture flip-flop 1 makes the correct decision (subject to the usual rules for sampling and the like), the correct data shows up as a bit stream at RXDATA.

To achieve feedback in FIG. 1, the bit stream is passed through a discrete-time FIR (Finite Impulse Response) digital filter that approximates the impulse response of the channel H(s), that is:

$$H(s) \cong \sum_{n=0}^{N-1} h_n$$

The result, after passing through n-order coefficients for the FIR comprising Tap Weight DAC (digital-to-analog converters) and being summed, is subtracted at summing circuit 3 from the incoming signal.

The negative feedback at summing circuit 3 has the effect of boosting the high-frequency content of the incoming signal, however, due to the digital, quantized nature of the feedback, the unwanted noise at the input is not boosted.

The DFE of FIG. 1 implemented by discrete-time FIR filters has a number of difficulties that the present invention seeks to overcome. For the DFE of FIG. 1 to work properly, the feedback from the output of each D flip-flop/latch as shown in FIG. 1, fed through the tap weights DAC, and the summing node 3, must occur in less than one bit time. This condition places strict requirements on the flip-flop clock-to-Q time, the propagation time through the tap weight DACs, and the summing node 3. To meet this condition in the FIG. 1 DFE requires high bandwidth within the circuit and the circuit consumes much power. While the bandwidth requirements can be alleviated for all taps except the $h_0$ term by using a multi-phase architecture, this requires duplication of circuitry and thus requires more power and chip area to implement.

Furthermore, for the DFE system of FIG. 1 to work, the capture flip-flop clock (CLK) has to be generated by a phase locked loop (PLL) that locks to rate of the incoming data TXDATA as it leaves the channel and is received at the input of the summer 3. The operation of the equalizer relies on this clock being properly locked to this incoming data TXDATA. Since the clock recovery PLL extracts timing information from the recovered data RXDATA, the operation of the clock recovery PLL depends to some extent on the correct operation of the equalizer. This interdependence can make the operation of the discrete-time DFE of FIG. 1 somewhat temperamental and sensitive to disturbance.

Factoring all of the above, it can be seen that what is needed is a superior method and apparatus for a DFE of the kind used in high-speed serial transmission of digital data.

SUMMARY OF THE INVENTION

Accordingly, an aspect of the present invention is to provide an improved Decision Feedback Equalizer (DFE). Thus the present invention relates to a decision feedback equalizer incorporating continuous-time filters in a continuous-time feedback loop.

The DFE of the present invention consumes less power, is of a more stable design, and overcomes the attenuation of high-frequencies and the low-bandpass filter problem of communication channels.

The present invention improves the state because the continuous time Infinite Impulse Response (IIR) feedback (e.g., in the general case the feedback of the outputs is used to calculate other output values) is a low-pass function. In some prior art there is employed a Finite Impulse Response (FIR) function that necessarily has to have higher bandwidth. Thus, in the same process technology, the circuit of the present invention can be made smaller and of lower power. This invention employs a different basis function that inherently spans multiple bit times, whereas some prior art needs to add circuitry for each additional bit time that needs to be corrected.

The DFE of the present invention is trainable, programmable and adaptable to any communication channel, including intrachip channels as well as interchip channels.

The DFE of the present invention may be thought of as a mixed signal solution employing a non-linear hybrid dynamical system with analog and discrete domains and memory, with the analog portion retaining more feedback information at a lower cost in terms of circuit power consumption and area than a purely digital DFE solution would employ.

The DFE of the present invention, in a preferred embodiment, preferably involves, in a portion of the circuit, a feedback filter in the continuous-time domain, which greatly simplifies the circuitry and helps reduce the temperamental interaction between the clock recovery PLL and the DFE, as compared to the FIG. 1 design.

Because the feedback filter in the DFE of the present invention is implemented as a continuous-time filter in a continuous-time feedback loop, the power consumed can be considerably reduced from that of a FIR-based and/or discrete-time DFE.

For example, in a recent study on the feasibility of adding DFE capability using the teachings of the present invention, for a serial transmission at 6.4 Gb/s using digital discrete-time filters, the number of high-speed gates running at bit rate was reduced by 75% over other methodologies. This corresponds to a power reduction of at least 75% due to the reduction of the high speed circuits themselves and their associated clock distribution network.

While in the preferred embodiment the present invention is directed to a serial transmission protocol system involving digital data, other types of protocols and data can also be accommodated by the present invention without departing from the teachings thereof.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

FIG. 1 is a schematic of Decision Feedback Equalization (DFE) in a high-speed serial communication circuit that the present invention improves upon.

FIG. 2A is a first preferred embodiment for a Decision Feedback Equalizer (DFE) for a high-speed serial communication circuit operating in the continuous-time domain, employing a first-order DFE filter; FIG. 2B is a variant of the first preferred embodiment for a DFE of FIG. 2A, employing an n-th order DFE filter.

FIG. 3 is a second preferred embodiment for a Decision Feedback Equalizer (DFE) for a high-speed serial communication circuit.

FIG. 4 is a third preferred embodiment for a Decision Feedback Equalizer (DFE) for a high-speed serial communication circuit.

FIG. 5 is a differential signal amplifier version of the embodiment of FIG. 2.

It should be understood that one skilled in the art may, using the teachings of the present invention, vary embodiments shown in the drawings without departing from the spirit of the invention herein.

DETAILED DESCRIPTION OF THE INVENTION

In all the preferred embodiments taught in the present invention, the DFE (Decision Feedback Equalizer) of the present invention operates a feedback loop that is in the continuous time domain, employing continuous-time active filters, and not employing discrete-time domain filters, such as digital FIR (Finite Impulse Response) filters or digital IRR (Infinite Impulse Response) filters. Because the filters in the DFE of the present invention operate in the continuous time domain and the DFE employs active filters (e.g., filters using transistors and amplifiers, such as op-amps), some of the problems associated with the FIG. 1 embodiment, such as synchronizing the clock domains between the equalizer and the capture flip-flop clocks are avoided. Other advantages of using active filters in the continuous time domain such as taught in the present invention, over a discrete time filter DFE scheme such as shown in FIG. 1, include: the elimination of potential aliasing problems, filter tunability not as dependent on a clock, smaller power and area requirements, and therefore less expensive designs, fewer potential problems with noise, such as high-frequency clock noise and thermal noise, and the like.

Turning now to FIG. 2A, there is shown a first preferred embodiment for a Decision Feedback Equalizer (DFE) for a high-speed serial communication circuit communicating with a channel, comprising three principal components: a decision circuit 10, a first-order continuous-time filter 20 and a summer 30, which are all inside the DFE feedback loop 40, and a capture flip-flops (FF) 50, such as a D-latch, operatively connected to but lying outside of the DFE feedback loop 40. In the FIG. 2A embodiment, there is present a first-order continuous time DFE having only the terms a0, h0(s) of a continuous time filter. The FIG. 2A is the embodiment most likely not to have the temperamental interaction between the clock recovery for the D-latch and the DFE, as opposed to the FIG. 1 design.

In the FIG. 2A embodiment the circuit is a first order continuous time active filter, and the capture FF 50 would lie outside the DFE feedback loop 40 as shown.

The decision circuit 10 in FIG. 2A may be a limiting amplifier, that will decide whether the pulse signals constituting the input communication pulse data bit stream represent either a digital '1' or a digital '0'. The limiting amplifier is based on an op-amp, but in the FIG. 2A embodiment, as well as the other embodiments of the present invention, other functionally equivalent and comparable decision circuits may be used; i.e., any circuit combination reasonable to decide whether or not an input is a digital '1' or '0', with suitable bandwidth, voltage, power and the like to achieve proper operation.

Turning now to FIG. 2B, there is shown a variant of the first preferred embodiment for a Decision Feedback Equalizer (DFE) for a high-speed serial communication circuit communicating with a channel, comprising three principal components: a decision circuit 10', an n-th order continuous-time filter 20' (as opposed to the first-order continuous-time filter 20 shown in the FIG. 2A embodiment) and a summer 30', which are all inside the DFE feedback loop(s) 40', and one or more capture flip-flops (FF) 50', 51', 52', 50'', such as a D-latch, operatively connected to the DFE feedback loop 40'. The FIG. 2B embodiment shows the most general case, namely, an nth order continuous time filter if the terms a1, h1(s); a2, h2(s); . . . an–1, hn–1(s) are present, as shown in FIG. 2B.

The decision circuit 10' in FIG. 2B may be a limiting amplifier, that will decide whether the pulse signals constituting the input communication pulse data bit stream represent either a digital '1' or a digital '0'. The limiting amplifier is based on an op-amp, but in the FIG. 2B embodiment, as well as the other embodiments of the present invention, other functionally equivalent and comparable decision circuits may be used; i.e., any circuit combination reasonable to decide whether or not an input is a digital '1' or '0', with suitable bandwidth, voltage, power and the like to achieve proper operation.

The continuous time filter 20', having transfer function h(s) as shown in FIG. 2B, comprising the feedback loop 40' that constitutes the n-th order continuous time filter, should be designed to approximate the channel response H(s), which is experienced by the incoming pulse data signal TXDATA, which is output from the channel. Continuous time filter 20', having transfer function h(s), is an active filter, and can have coefficients that are programmable, that in turn can be trained to adapt the active filter to have its transfer function h(s) best fit or match the channel response transfer function H(s). Thus while in FIG. 2A the continuous-time filter 20 is a single RC pole filter (with only the terms a0, h0(s) of the continuous time filter present), in FIG. 2B there is shown a more complicated N-th order active filter (with the other terms a1, h1(s); a2, h2(s); . . . an–1, hn–1(s) are present), with the active filter being programmable to accommodate for different channel responses.

In the example shown in FIG. 2A, a single order active filter would have only a coefficient $a_0$ (related to the gain), that matches the feedback signal at summer 30 to the amplitude of the incoming data signal of TXDATA as received through the channel at the input to the summer 30. The coefficient of this first order active filter can be calculated from known techniques such as using auto adaptation, using a filter parameter such as the cutoff frequency of the filter, or by other suitable techniques.

In the case of an nth-order filter, having coefficients and transfer function a0, h0(s); a1, h1(s); a2, h2(s), . . . an–1, hn–1(s), as shown in FIG. 2B, the output Q of capture flip-flop 50' is fed into the a1, h1(s) components of the nth-order filter, as well as into the input D of the capture flip-flop 51', which acts as a delay, and in turn its output, at Q of flip-flop 51', is feed into the next input D of the next cascading flip-flip, shown as flip-flop 52' in FIG. 2B, as well as the a2, h2(s) components of the nth-order filter, as shown in FIG. 2B. The process repeats, in turn, as shown in FIG. 2B with the repeating ellipsis symbols, for as many "n" stages as is necessary for the nth-order filter, such as components an–1, hn–1 and flip-flop 50''. This repeating arrangement as shown in FIG. 2B can be termed a cascading n-th order filter having delay elements comprising the capture flip-flops 50', 51', 52', 50'', which feeds their output to the next subsequent component of the filter as well as the input to the next subsequent flip flop in the cascade.

In all cases, whether there are first-order or nth-order filters employed, the goal of the DFE feedback loop is to approximate the transfer function impulse response of the channel H(s) so that the distortion caused by the channel H(s) may be offset and corrected through the application of negative feedback as taught herein, hence:

$$H(s) \cong \sum_{k=0}^{n-1} a_k h_k(s) e^{-skT}$$

Where T is the clock period in seconds.

In FIG. 2B the summer 30', having two branches, receives at one branch negative feedback from continuous-time filter 20' inverts and adds it to the second branch of summer 30', which receives the incoming transmitted data signal TXDATA, as output from the channel having transfer function H(s). The summer 30' outputs the sum of the two branches as input to the decision circuit 10'.

The capture flip-flop 50 in FIG. 2A, which is placed outside the DFE loop 40 when the active filter 20 is a first-order filter (as shown in FIG. 2A), is used to capture data output by the decision circuit 10, and the capture flip-flop 50 outputs as a bit stream data RXDATA, representing the received data after correction. The capture flip-flop 50 is preferably in the form of a D-latch gated by a clock CLK as shown.

The capture flip-flop 50' in FIG. 2B, is not placed outside the DFE loop 40 when the active filter 20 is a nth-order filter (as shown in FIG. 2B), but feeds back its output as explained herein. The capture flip-flop 50' of FIG. 2B is used to capture data output by the decision circuit 10', and the capture flip-flop 50' outputs as a bit stream data RXDATA, representing the received data after correction. The capture flip-flop 50' is preferably in the form of a D-latch gated by a clock CLK as shown.

In the FIGS. 2A and 2B embodiment, as well as the other embodiments of FIGS. 3-4 the clock CLK for the D-latch is generated by a PLL. A PLL, DLL (Delay Locked Loop), and a phase interpolator can all generate the recovered clock. With respect to the FIG. 2A embodiment, the clock derived signal does not need to feed-back, and imperfections in the clock do not affect the rest of the circuit. The PLL locks to the incoming data TXDATA as output from the channel; however, the PLL of clock CLK does not depend on close interaction with the DFE loop 40. Thus it is significant in the FIG. 2A embodiment that the clock recovery loop that is part of the D-latch does not have to be coupled directly with the DFE loop 40, in the same manner as done by the DFE circuit of FIG. 1, and is thus substantially independent of direct coupling with the DFE loop 40. Thus the circuitry of the FIG. 2A embodiment is greatly simplified over the circuitry of FIG. 1, and the complex interaction between the clock recovery PLL portion of the circuit and the DFE is reduced.

In the embodiment of FIGS. 2A and 2B, because the feedback filter in the DFE of the present invention is implemented as a continuous-time filter, the power consumed can be considerably reduced from that of a FIR-based or discrete-time DFE systems (shown in FIG. 1), or from prior art linear high pass filter systems.

Turning attention now to FIG. 3, there is shown a second preferred embodiment for a Decision Feedback Equalizer (DFE) for a high-speed serial communication circuit of the present invention, with the capture flip-flop inside the feedback loop, for a first order continuous time active filter.

In the embodiment of FIG. 3, the capture flip-flop 503 is placed inside the DFE feedback loop 403. The DFE loop 403, as in the FIG. 2 embodiment, has a decision circuit 103 (e.g., a limiting amp), a first order, continuous-time active filter 203, having transfer function h(s), which in general may be an n-th order active filter as per FIG. 2B, and which may be implemented by op-amps and have programmable coefficients as before. The active filter 203 receives the signal output by the capture flip-flop 503, comprising signal RXDATA, and feeds this signal, as negative feedback, into a summer 303. As before, the summer 303 receives the negative feedback from continuous-time active filter 203, inverts it and adds it to the incoming transmitted data signal TXDATA that is output from the channel having transfer function H(s), and received as input at summer 303; and after summation of the two braches the result is output as input to the decision circuit 103.

One difference between the FIG. 3 embodiment and the FIG. 2 embodiment is that the capture flip-flop 503 is placed inside, that is, serial to (in-line with), the DFE loop 403 as shown. One effect of this change is that it may relax the specifications required for the limiting amplifier 103. The burden of the decision of whether incoming data is a digital '1' or '0' is shared by the flip flop 503 and the limiting amp 103 in FIG. 3. The FF specifications, the setup time, hold time, propagation delay, master hold and the like are all part of the equation in deciding whether or not the data is a '1' or '0'. The limiting amp's propagation delay and gain may trade off with the performance of the flip-flop in FIG. 3. This relaxation of limiting amplifier specifications, however, comes at the expense of more difficult to capture flip-flop specifications. The capture flip-flop 503 in the FIG. 3 embodiment might need fast propagation delay primarily, so a high unity gain bandwidth would be required for the interrelation between the circuitry comprising the DFE loop 403 and the clock recovery PLL for clock CLK of the capture flip-flop.

Turning attention to FIG. 4, there is shown a third preferred embodiment for a Decision Feedback Equalizer (DFE) for a high-speed serial communication circuit. In the embodiment of FIG. 4, the summer and limiting amp of the embodiments of FIGS. 2 and 3 are replaced by a comparator op-amp 104, which also functions as the decision circuit, as shown, with all other elements otherwise the same. Functionally, this embodiment is substantially equivalent to the other two embodiments. The summer and limiting op amp 10 of FIG. 2 and 103 of FIG. 3, the comparator op-amp 104 of FIG. 4, and the Summing Amplifier 510 and the Decision Circuit—Limiting Amplifier 520 of FIG. 5, as well as all other equivalent circuits known to one of ordinary skill in the art using the teachings of the present invention, can be termed generically as a negative-feedback comparator decision circuit.

In the FIG. 4 embodiment, the output from the continuous-time active filter 204, having transfer function h(s), is a simple first-order active filter, but in general can be an n-th order continuous time active filter as shown in FIG. 2B. The output of this active filter 204 is fed to the inverting input of comparator op-amp 104, while the non-inverting input of comparator op-amp 104 receives the signal comprising the incoming data stream signal TXDATA as output by the channel having transfer function H(s). The output of comparator 104 is feed to both the data input D of capture D-latch 504 and fed back to the continuous-time active filter 204. The first order continuous time active filter 204 is a first order single pole RC active filter having a coefficient $a_0$ (related to the gain), which can be calculated using auto adaptation, and can be programmed. The first order active filter is programically tunable, either by training or otherwise, so the coefficient(s) of the active filter having transfer function h(s) approximates the channel response H(s). Capture flip-flop 504 remains outside of the DFE negative feedback loop 404, but it may also be placed, as in FIG. 3, inside the loop 404. The output Q of the capture flip-flop 504 represents the corrected received data, RXDATA, which is corrected for any distortion caused by the communication channel having transfer function H(s) by application of the proper negative feedback.

Turning attention now to FIG. 5, there is shown a more detailed implementation of the FIG. 2A embodiment of the present invention. In the FIG. 5 embodiment, differential signaling is used throughout for added noise immunity, and the operation is substantially the same as in FIG. 2A. The transmit signal TXDATA 512 that passes through the channel having channel response H(s) is presented differentially to the summing amplifier (SA) 510, which corresponds to summer 30 in FIG. 2A, and is received at the IN+ and IN− inputs branch of the SA.

The output of the summing amplifier 510 passes through the limiting amplifier and decision circuit 520, which corresponds to the decision circuit 10 of FIG. 2A. The output of the limiting amplifier and decision circuit 520, which comprises a plurality of Current Mode Logic (CML) Amplifier op-amps 522, 522', 522" in series as shown, is fed to a programmable-output swing amplifier (PSA) 540 (corresponding to the gain term a0 an of the first-order continuous-time filter 20 of FIG. 2A).

The output of this PSA 540 is filtered by the first order feedback filter 550, comprising resistors R and capacitors C of the filter generally in series and in parallel, with the capacitors in the feedback filter variable in order to be able to change the feedback filter 550 cutoff frequency. The values of the resistors and capacitors are chosen to have the transfer function h(s) approximate match the transfer function H(s) of the channel, as taught above, so that $h(s)=1/(RCs+1)$.

The elements comprising PSA 540 and Feedback Filter 550 comprise the decision feedback equalization circuit portion of the decision feedback equalizer, which provides negative feedback.

The resulting signal output by the PSA 550 is presented out of phase to the branch comprising the differential feedback inputs FB+ and FB− of the SA 510.

The SA 510 output is the sum of the input signal 512 from the channel, at IN+, IN− of the SA 510, and the feedback signal at FB+, FB−. The PSA 540 is connected as shown to be out of phase to the SA 510 through the feedback filter 550, so that the "+" positive terminal output of the PSA 540 makes its way to the input FB− of the SA 510, while the "−" negative terminal output makes its way to the input FB+ of the SA 510. This in effect turns the summing amplifier 510 into a differencing amplifier. The feedback signals FB+ and FB− are subtracted from the input signals IN+ and IN−.

The output of the SA 510 goes to the Limiting Amplifier 520 if the input to the Limiting Amplifier 520 is positive. The Limiting Amplifier 520 will amplify this positive value until it reaches the limit at its maximum positive output. Similarly, if the input to the Limiting Amplifier 520 is negative, the Limiting Amplifier 520 will amplify it until it limits at its maximum negative output. This limiting behavior causes the Limiting Amplifier 520 to act as a comparator: the output goes high if the input is greater than zero, and the output goes low if the input is less than zero. The higher the gain, the smaller the input signal required to make the output limit, and the higher the receiver sensitivity.

The output of the Limiting Amplifier 520, which is essentially a digital signal, is fed to the Capture Flip-Flops (such as, in FIG. 2A, capture latch 50) for recovery of the transmitted data.

The output of the Limiting Amplifier 520 is also fed to the Programmable Swing Amplifier 540. The PSA 540 takes the digital signal from the Limiting Amplifier 520 and regenerates it with a programmable amplitude. This signal is filtered by the RC Feedback Filter 550 to generate the feedback signal. The PSA 540 output swing is set to give the correct feedback amplitude based on the amplitude of the incoming signal.

Further regarding the Decision Circuit and Limiting Amplifier 520, while three differential op-amplifiers are used in the Limiting Amplifier 520 in series to output the signal to a another CML Amplifier 530 (which acts as a buffer to drive the capacitance of the capture flip-flops, and lies outside the feedback loop formed by summing amplifier 510, Limiting Amplifier 520, PSA 540 and Feedback Filter 550), which in turn outputs to the Capture FFs, it is possible that one of ordinary skill in the art using the teachings of the present invention can use less than three or more than three differential op-amps. The number of op-amps in the Limiting Amplifier 520 is related to the gain and delay of the signal. Adding more differential op-amps will create more delay, which may have the effect of making the phase of the feedback signal incorrect, however, adding more differential op-amps will also boost the gain of the signal, resulting in a higher input sensitivity.

The coefficients of the continuous time active filter, having transfer function h(s) for the FIGS. 2, 3 4 and 5 embodiments of the present invention, may be programmable, adaptive, and/or trainable, with a training sequence on start-up, and identified using a variety of techniques, including but not limited to a active filter having Butterworth, Bessel, Chebyshev, Sallen Key (VCVS), or elliptic filter coefficients, with said coefficients identified with a variety of techniques known to one of ordinary skill using the teachings of the present invention, including but not limited to Least Means Square (LMS), a lookup table, computer programming heuristics and formulas, using a neural network, or other algorithms. The filter may be of any order, and may be cascaded to give not only h(s) as taught above, but any sort of transfer function, including but not limited to any bandpass, notch, low-pass, high-pass and all-pass filter. The active filter may be analyzed in the time and/or frequency domain using software tools for analyzing and constructing filters.

In addition, while active filters are contemplated using amplifying elements, especially operational amplifiers, with resistors and capacitors in their feedback loops, as in the continuous-time active filters in the FIGS. 2-4 embodiments of the present invention, using the teachings of the present invention one of ordinary skill in the art may instead opt to substitute a passive filter (i.e. a continuous time filter comprising resistors, capacitors and/or inductors) in lieu of the active filters taught herein. However, a passive filter will suffer the known penalties associated with using passive filters rather than active filters.

Further, although the present invention has been described in terms of the preferred embodiments above, numerous modifications and/or additions to the above-described preferred embodiments would be readily apparent to one skilled in the art. For example, while in the preferred embodiment operational amplifiers are used, with passive elements, any other type of filter can be used that achieves a continuous-time domain effect, such as the substitution of such as Switched-Capacitor (SC) filters in the continuous time domain.

It is intended that the scope of the present invention extends to all such modifications and/or additions and that the scope of the present invention is limited solely by the claims set forth below.

We claim:

1. A decision feedback equalizer for a communications system operating in a communications channel, comprising:
   a comparator decision circuit having a first branch receiving a plurality of data pulse signals output from a communications channel and having a second branch receiving negative feedback;
   a decision feedback equalization circuit (DFE), said DFE receiving output from said comparator decision circuit and having a feedback loop to provide negative feedback to said comparator decision circuit, said second branch of said comparator decision circuit receiving said negative feedback relating to said DFE; wherein,
   said DFE operates in the continuous time domain,
   said comparator decision circuit comprises a summer and limiting op-amp, and further comprising a capture flip-flop operatively connected to said DFE but outside said DFE feedback loop.

2. The apparatus of claim 1, wherein:
   said DFE has a continuous-time filter in said DFE feedback loop.

3. The apparatus of claim 2, wherein:
   said DFE continuous-time filter is an active filter.

4. The apparatus of claim 3, wherein:
   said DFE continuous-time active filter is an active filter selected from the group consisting of operational amplifiers having passive elements, and Switched Capacitor filters.

5. The apparatus of claim 3, wherein:
   said active filter is a first-order filter.

6. The apparatus of claim 3, wherein:
   said active filter is a nth-order filter.

7. The apparatus of claim 6, further comprising:
   a plurality of capture flip-flops acting as delay elements, operatively connected to said DFE, said nth-order active filter having a plurality of components a0, h0(s); a1, h1(s); a2, h2(s); . . . an−1, hn−1(s), and is a cascading n-th order filter having said capture flip-flops as delay elements, with the output of each said flip-flop feeding their output to the subsequent component of the filter as well as to the input to the subsequent flip flop in the-cascade.

8. The apparatus of claim 6, wherein:
   said nth-order filter active filter having filter coefficients, said filter coefficients selected from the group consisting of Butterworth, Bessel, Chebyshev, Sallen Key (VCVS), or elliptic filter coefficients.

9. The apparatus of claim 1, wherein:
   said summer is a differential signal amplifier, and said limiting op-amp comprises a plurality of Current Mode Logic amplifiers serially connected;
   said DFE comprises a programmable swing amplifier operatively connected to the output of said limiting op-amp, and a feedback filter operatively connected to the output of said programmable swing amplifier.

10. The apparatus of claim 1, further comprising:
    a clock, said clock generated by a phase locked loop (PLL), said capture flip-flop gated by said clock, said PLL locked to the rate of said data pulse signals, and said capture flip-flop clock substantially independent of direct coupling with the DFE loop.

11. A method for decision feedback equalization using a decision feedback equalizer in a communication system, comprising the steps of:

providing a comparator decision circuit for ascertaining whether pulses in a communication receiver pulse data bit stream are a digital '1' or '0', wherein said pulse data bit stream is received from a communication channel having transfer function H(s), said pulse data bit stream comprising data TXDATA distorted by the communication channel;

providing negative feedback to said comparator decision circuit from a negative feedback loop in a decision feedback equalizer (DFE), said decision feedback equalizer operating in the continuous time domain and having active filters, said decision feedback equalizer having a transfer function h(s);

matching said decision feedback equalizer transfer function h(s) so that it is substantially equal to the transfer function H(s) of said communication channel;

operatively connecting a capture flip-flop to said DFE; said comparator decision circuit comprises a summer and limiting op-amp; and, situating said capture flip-flop outside said DFE negative feedback loop.

12. The method of claim 11, further comprising the steps of:

matching said decision feedback equalizer transfer function h(s) to substantially equal the transfer function H(s) of said communication channel by programming the coefficients of said active filters, said active filters having programmable coefficients.

13. The method of claim 11, wherein:

said comparator decision circuit comprises an summing amplifier and a decision circuit, said summing amplifier and decision circuit operating according to differential signaling.

14. A decision feedback equalizer for a communications system operating in a communications channel, comprising:

a comparator decision circuit having a first branch receiving a plurality of data pulse signals output from a communications channel and having a second branch receiving negative feedback;

a decision feedback equalization circuit (DFE), said DFE receiving output from said comparator decision circuit and having a feedback loop to provide negative feedback to said comparator decision circuit, said second branch of said comparator decision circuit receiving said negative feedback relating to said DFE, said DFE operates in the continuous time domain, said DFE has a continuous-time filter in said DFE feedback loop, said DFE continuous-time filter is an active filter and said active filter is a nth-order filter;

a plurality of capture flip-flops acting as delay elements, operatively connected to said DFE, said nth-order active filter having a plurality of components $a0$, $h0(s)$; $a1$, $h1(s)$; $a2$, $h2(s)$; ... $an-1$, $hn-1(s)$, and is a cascading n-th order filter having said capture flip-flops as delay elements, with the output of each said flip-flop feeding their output to the subsequent component of the nth-order active filter as well as to the input to the subsequent flip flop in the cascade.

15. A method for decision feedback equalization using a decision feedback equalizer in a communication system, comprising the steps of:

providing a comparator decision circuit for ascertaining whether pulses in a communication receiver pulse data bit stream are a digital '1' or '0', wherein said pulse data bit stream is received from a communication channel having transfer function H(s), said pulse data bit stream comprising data TXDATA distorted by the communication channel;

providing negative feedback to said comparator decision circuit from a negative feedback loop in a decision feedback equalizer (DFE), said decision feedback equalizer operating in the continuous time domain and having active filters, said decision feedback equalizer having a transfer function h(s);

matching said decision feedback equalizer transfer function h(s) so that it is substantially equal to the transfer function H(s) of said communication channel;

operatively connecting a capture flip-flop to said DFE, said capture flip-flop lying outside the negative feedback loop;

gating said capture flip-flop with a clock, said clock generated by a phase locked loop (PLL) locked to the rate of said communication receiver pulse data bit stream received by said comparator decision circuit; wherein, said capture flip-flop clock is not directly dependent on direct coupling with any clock involved with the operation of the DFE.

* * * * *